(12) United States Patent
Ozer et al.

(10) Patent No.: US 7,693,051 B2
(45) Date of Patent: Apr. 6, 2010

(54) SYSTEM AND METHOD FOR CONTROLLING CONGESTION IN MULTIHOPPING WIRELESS NETWORKS

(75) Inventors: Sebnem Z. Ozer, Altamonte Springs, FL (US); Surong Zeng, Altamonte Springs, FL (US); Charles R. Barker, Jr., Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 421 days.

(21) Appl. No.: 11/300,526

(22) Filed: Dec. 14, 2005

(65) Prior Publication Data

US 2006/0146704 A1 Jul. 6, 2006

Related U.S. Application Data

(60) Provisional application No. 60/637,252, filed on Dec. 17, 2004.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............ 370/229; 370/235; 370/236; 370/237; 370/238; 370/310

(58) Field of Classification Search ............ 370/229, 370/230, 235, 236, 237, 338, 328, 310, 310.2
See application file for complete search history.

(56) References Cited

U.S. PATENT DOCUMENTS

| | | |
|---|---|---|
| 4,445,214 A | 4/1984 | Reynolds et al. |
| 5,844,905 A | 12/1998 | McKay et al. |
| 5,943,322 A | 8/1999 | Mayor et al. |
| 6,404,756 B1 | 6/2002 | Whitehill et al. |
| 6,405,045 B1 | 6/2002 | Choi et al. |
| 6,463,286 B1 | 10/2002 | Salminen |
| 6,556,582 B1 | 4/2003 | Redi |
| 6,625,118 B1 * | 9/2003 | Hadi Salim et al. ......... 370/229 |
| 6,704,316 B1 | 3/2004 | He |

(Continued)

OTHER PUBLICATIONS

CODA: Congestion Detection and Avoidance in Sensor Networks—Chieh-Yih Wan et al—Columbia University—SenSys 2003—pp. 266-279.

(Continued)

*Primary Examiner*—Huy Phan
(74) *Attorney, Agent, or Firm*—Randi L. Karpinia

(57) ABSTRACT

A system and method to control congestion in a multihopping wireless communication network (100). The system and method distribute the congestion information back to the ingress points (106) and traffic source nodes (102, 106, 107) in the network (100) through the actual route of the data flow that contributes to the congestion. The system and method therefore avoid bottleneck points (102-5) in the network (100) to reduce congestion. The system and method can be used for packet-based, route-based or flow-based traffic shaping in a multihop wireless network (100) employing different media access control (MAC) and routing layer protocols. Moreover, the system and method is capable of distributing congestion and service differentiation information between different interfaces in the network (100).

20 Claims, 3 Drawing Sheets

U.S. PATENT DOCUMENTS

| | | | |
|---|---|---|---|
| 6,807,165 | B2 | 10/2004 | Belcea |
| 6,839,321 | B1 * | 1/2005 | Chiruvolu ................ 370/230.1 |
| 6,873,839 | B2 | 3/2005 | Stanforth |
| 7,072,650 | B2 | 7/2006 | Stanforth |
| 7,075,890 | B2 | 7/2006 | Ozer et al. |
| 7,174,170 | B2 * | 2/2007 | Steer et al. ................... 455/446 |
| 7,200,116 | B2 * | 4/2007 | Kobayashi ................... 370/237 |
| 7,280,545 | B1 * | 10/2007 | Nagle ......................... 370/400 |
| 7,295,516 | B1 * | 11/2007 | Ye .............................. 370/232 |
| 7,353,314 | B2 * | 4/2008 | Suzuki et al. ............... 710/306 |
| 7,542,478 | B1 | 6/2009 | Ozer et al. |
| 2001/0012272 | A1 * | 8/2001 | Aubert et al. ............... 370/230 |
| 2002/0058502 | A1 | 5/2002 | Stanforth |
| 2002/0080755 | A1 | 6/2002 | Tasman et al. |
| 2002/0122410 | A1 * | 9/2002 | Kulikov et al. ............. 370/349 |
| 2003/0053415 | A1 * | 3/2003 | Balakrishnan et al. ...... 370/229 |
| 2003/0076781 | A1 * | 4/2003 | Enomoto et al. ............ 370/229 |
| 2003/0115355 | A1 * | 6/2003 | Cometto et al. ............. 709/234 |
| 2003/0142645 | A1 | 7/2003 | Belcea |
| 2003/0189901 | A1 * | 10/2003 | Ozugur et al. .............. 370/230 |
| 2004/0032826 | A1 * | 2/2004 | Sridhar ....................... 370/222 |
| 2004/0143842 | A1 | 7/2004 | Joshi |
| 2004/0157613 | A1 | 8/2004 | Steer et al. |
| 2004/0203820 | A1 | 10/2004 | Billhartz |
| 2004/0257996 | A1 | 12/2004 | Choi et al. |
| 2004/0258092 | A1 | 12/2004 | Sugaya |
| 2004/0264372 | A1 * | 12/2004 | Huang ......................... 370/230 |
| 2005/0094594 | A1 * | 5/2005 | Roh ............................ 370/328 |
| 2005/0100035 | A1 * | 5/2005 | Chiou et al. ................. 370/412 |
| 2006/0098677 | A1 | 5/2006 | Ozer |
| 2006/0104232 | A1 | 5/2006 | Gidwani |
| 2006/0133342 | A1 | 6/2006 | Zeng |
| 2007/0097941 | A1 | 5/2007 | Le et al. |

OTHER PUBLICATIONS

MACA—A New Channel Access Method for Packet Radio—Hpil Karn—ARL/CRRL Amateur Radio 9$^{th}$ Computer Networking Conference—Sep. 1990—5 pages.

MACAW: a Media Access Protocol for Wireless LAN's—V. Bharghavan et al—University of California—, vol. 24, No. 4.—1994—pp. 212-219.

Floor Acquisition Multiple Access (FAMA) for Packet-Radio Networks—Chane L. Fullmer et al—SIGCOMM 1995—pp. 262-273.

PCT/US05/45228, PCT Search Report-Written Opinion, mailed Nov. 9, 2006, 10 pages.

PCT/US05/45228, International Preliminary Report issued Jun. 19, 2007, 8 pages.

Kipo, "Office Action—Preliminary Rejection," (English Translation) KORS App. No. 1020077016430, Dec. 22, 2008.

Kipo, "Office Action—Last Preliminary Rejection," (English Translation) KORS App. No. 1020077016430, Jul. 20, 2009.

C.Y. Wan et al., "CODA: Congestion Detection and Avoidance in Sensor Networks," SenSys, Nov. 2003, pp. 1-14.

Phil Karn, "MACA: A New Channel Access Method for Packet Radio," ARL/CRRL Amateur Radio 9th Computer Networking Conference, Sep. 22, 1990.

Vaduvur Bharghavan et al., "MACAW: A Media Access Protocol for Wireless LAN's," Association of Computing and Machinery, 1994, pp. 1-9.

Fullmer, C. & Garcia-Luna-Aceyes, J.J., "Floor Acquisition Multiple Access (FAMA) for Packet-Radio Networks," Computer Communication Review, vol. 25, (No. 4), Oct. 1995, pp. 262-273.

Weiser, Mark, "Some Computer Science Issues in Ubiquitous Computing," Comm. ACM, V.36, N.7, Jul. 1993, pp. 75-85.

USPTO, Office Action dated Aug. 7, 2008—U.S. Appl. No. 11/158,737—20 pages.

Gupta, P. & Kumar, P.R., "The Capacity of Wireless Networks," IEEE Transactions on Info. Theory, vol. 46, No. 2, Mar. 2000, pp. 1-17.

M.J. Miller et al., "A Hybrid Network Implementation to Extend Infrastructure Reach," Technical Report, Jan. 2003, pp. 1-12.

IEEE, "Part 11—Wireless LAN Medium Access Control (MAC) and Physical Layer (PHY) Specifications," ANSI/IEEE Standard 802.11, ISO/IEC 8802-11:19999(E), Section 9.1.2, 1999 Edition, pp. 85-86.

Talucci et al., "MACA-BI (MACA by invitation): A Receiver Oriented Access Protocol for Wireless Multi-hop Networks," PIMRC'97, Helsinki, Finland, Sep. 1-4, 1997, pp. 435-439.

USPTO Office Action dated Feb. 4, 2009—U.S. Appl. No. 11/300,529- 17 pages.

* cited by examiner

SYSTEM AND METHOD FOR CONTROLLING CONGESTION IN MULTIHOPPING WIRELESS NETWORKS

This application claims the benefit of U.S. Provisional Application No. 60/637,252, filed Dec. 17, 2004 the entire content of which being incorporated herein by reference.

CROSS-REFERENCE TO RELATED APPLICATION

Related subject matter is described in a United States Patent Application Publication number US20060133342 by Surong Zeng entitled "System And Method For Communicating Within A Wireless Communication Network", filed concurrently herewith, and in U.S. patent application Ser. No. 11/158,737 by Sebnem Z. Ozer et al. entitled "A System and Method for Rate Limiting in Multi-Hop Wireless Ad Hoc Networks", filed on Jun. 22, 2005, the entire content of both being incorporated herein by reference.

FIELD OF THE INVENTION

The present invention relates to wireless communication networks and, more particularly, to a system and method for controlling congestion in a wireless multihopping communication network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted Oct. 19, 2004, and in U.S. Pat. No. 6,873,839 entitled "Prioritized-Routing for an Ad-Hoc, Peer-to-Peer, Mobile Radio Access System", granted Mar. 29, 2005, the entire content of each being incorporated herein by reference.

As can be appreciated by one skilled in the art, certain nodes in multihopping wireless networks may receive more traffic than others, and therefore become congested. Accordingly, it is desirable to attempt to avoid congested nodes when routing packets in the network. A publication by C. Y. Wan, S. B. Eisenman, and A. T. Campbell entitled "CODA: Congestion Detection and Avoidance in Sensor Networks", SenSys 2003, describes a congestion control algorithm for networks. In accordance with this algorithm, a suppression message for reducing traffic is broadcasted by devices in the network. However, the reliability of receiving this message is based on the channel quality and can require broadcasting of the message multiple times during the congested period. Hence, although these messages are propagated upstream through the network toward the sources of the traffic, these messages may not always be received by the sources. Furthermore, a node that receives the suppression message may choose to not propagate the message if its local network conditions are acceptable. Therefore, this technique for attempting to avoid congestion is not reliable.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
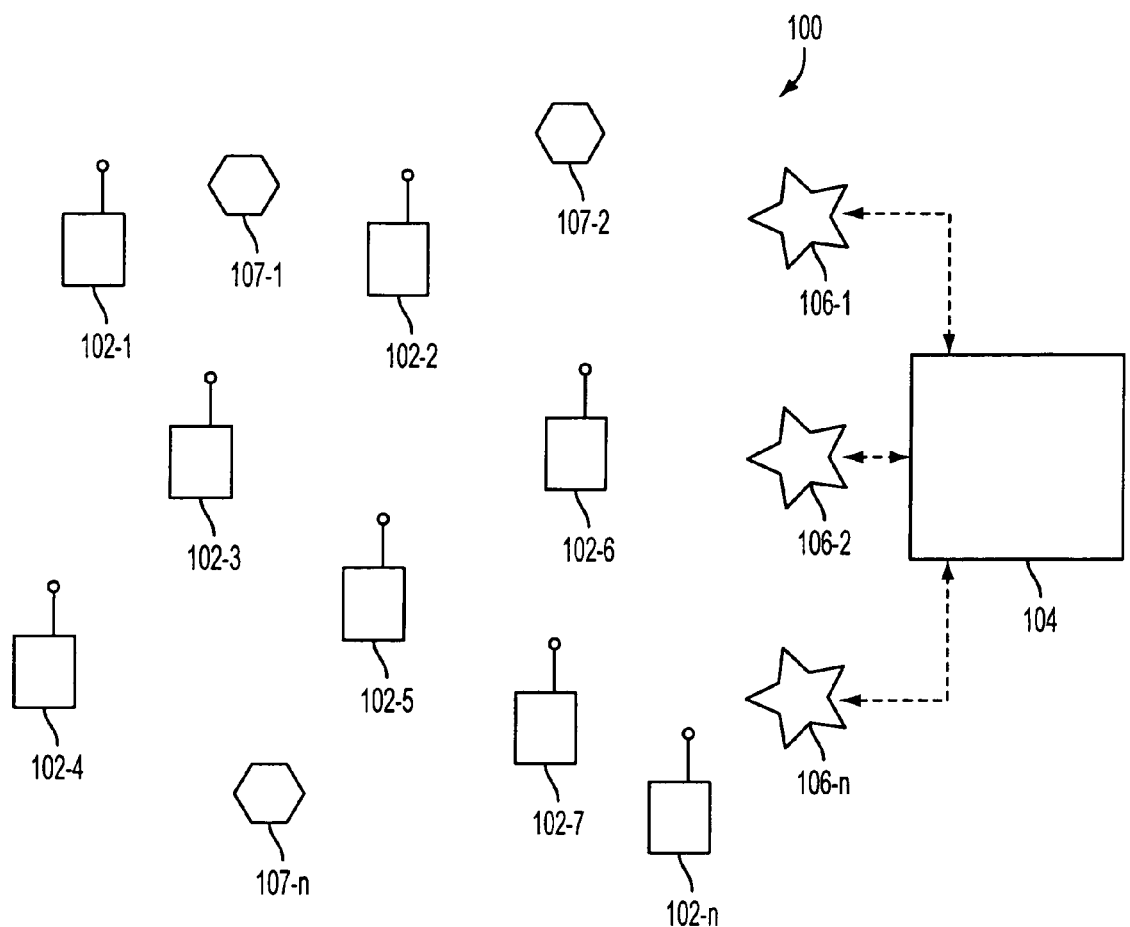
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for controlling congestion in a wireless multihopping communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for controlling congestion in a wireless multihopping communication network as described herein. The non-processor circuits may include, but are not limited to, a radio receiver, a radio transmitter, signal drivers, clock circuits, power source circuits, and user input devices. As such, these functions may be interpreted as steps of a method for controlling congestion in a wireless multihopping communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for controlling congestion in a wireless multihopping communication network by controlling the use of nodes acting as bottleneck points in multihopping wireless network. The system and method distribute congestion information back to the ingress points of the network (i.e., the nodes that operate as the interface between a wired portion of the network and a wireless potion of the network) and the nodes which are the source of the traffic in the network over the actual route of the data flow that contributes to the congestion. The ingress points and the source of the traffic can then avoid the use of the bottleneck nodes. The system and method can be used for packet-based, route-based, or flow-based traffic shaping in a multihop wireless network with different Media Access Control (MAC) and routing layer protocols. Moreover, the system and method can distribute congestion and service differentiation information between different interfaces in the network, such as the interfaces between nodes employing multiple transceivers. The system and method of the present invention is further capable of performing the above congestion control in the network without the use of a central controller.

FIG. 1 is a block diagram illustrating an example of an ad-hoc packet-switched multihopping wireless communications network 100 employing an embodiment of the present invention. Specifically, the network 100 includes a plurality of mobile wireless user terminals 102-1 through 102-n (referred to generally as nodes 102, subscriber devices (SDs) 102 or mobile nodes 102), and can, but is not required to, include a fixed network 104 having a plurality of access points 106-1, 106-2, ... 106-n (referred to generally as nodes 106, access points (APs) 106 or intelligent access points (IAPs) 106), for providing nodes 102 with access to the fixed network 104. The fixed network 104 can include, for example, a core local access network (LAN) or wide area network (WAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107 or wireless routers (WRs) 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 7,072,650, and U.S. Pat. Nos. 6,807,165 and 6,873,839, referenced above.

Figure 2:
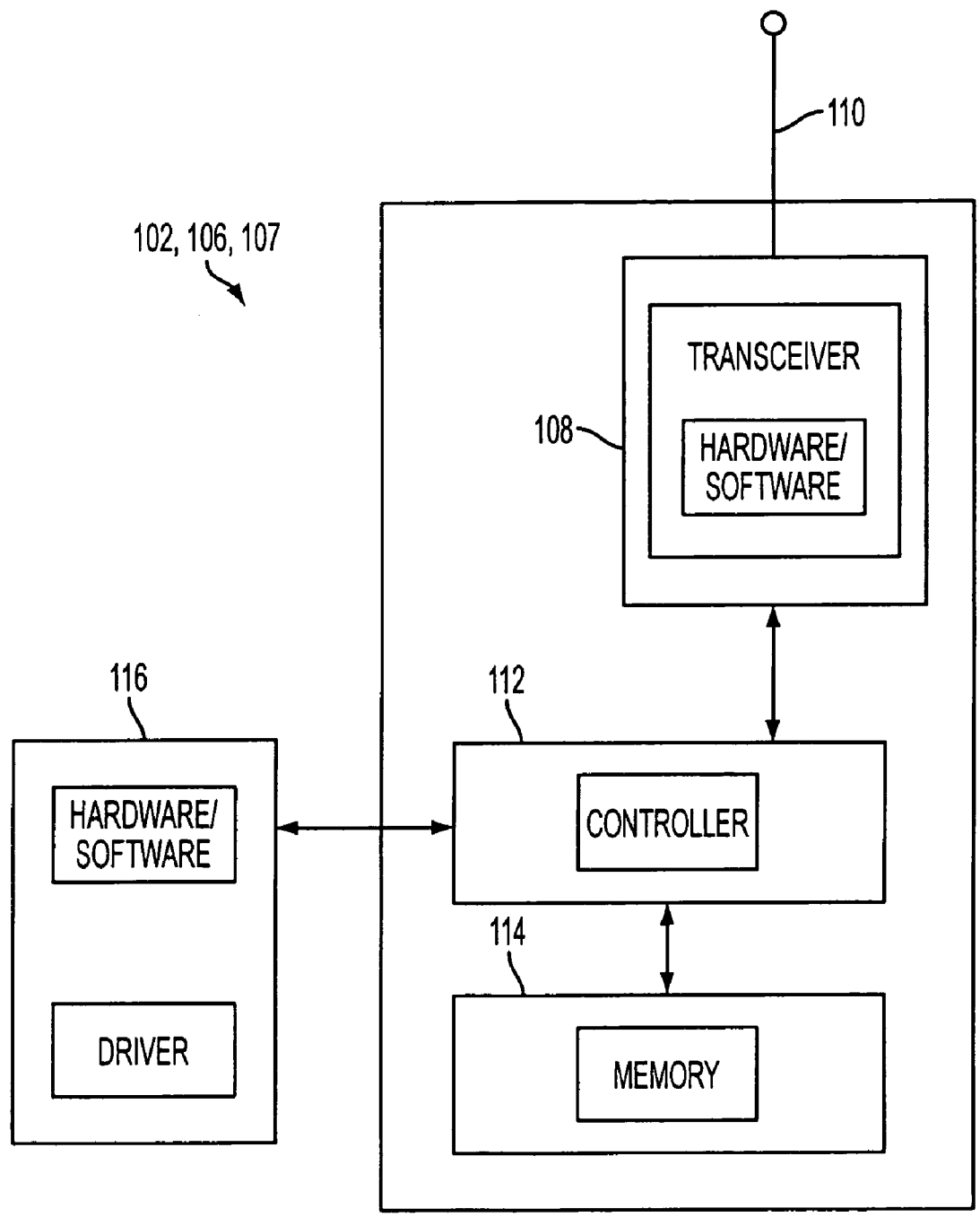
FIG. 2 is a block diagram illustrating an example of a node employed in the network shown in FIG. 1.

As shown in FIG. 2, each node 102, 106, and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As can be appreciated by one skilled in the art, a technique known as Multiple Access with Collision Avoidance (MACA) is a type of MAC protocol commonly used for transmitting packet in a multihopping wireless communication network. An example of the MACA protocol is described in an article by Phil Karn entitled "MACA—A New Channel Access Method For Packet Radio," ARL/CRRL Amateur Radio $9^{th}$ Computer Networking Conference, Sep. 22, 1990. Under the typical process for MACA and its variations, a node 102, 106 or 107 attempting to transmit a packet to a receiving node 102, 106 or 107 first sends a request-to-send (RTS) message to the receiving node 102, 106 or 107. Upon receiving the RTS successfully, the receiving node 102, 106 or 107 responds with a clear-to-send (CTS) message. The RTS and CTS messages contain information which includes source/destination addresses, transmission duration, and so on, relating to the intended packet transmission. Therefore, all nodes 102, 106 and 107 that receive the RTS and CTS messages will refrain from transmitting long enough to avoid collision with the node 102, 106 or 107 attempting to transmit the packet.

The transmitting node 102, 106 or 107 then transmits the packet upon receiving the CTS successfully, and the receiving node 102, 106 or 107 responds with an acknowledgment (ACK) message for the successful transmission to complete the transaction. In the case of a collision or unsuccessful transmission due to, for example, a bad channel condition, a random transmission delay value is increased progressively until a successful transmission occurs, and the delay value is then reset to the minimal value.

A multiple access with collision avoidance for wireless (MACAW) algorithm typically handles Automatic Repeat Request (ARQ) retransmissions for corrections of such errors by repeating the entire request-to-send/clear-to-send (RTS/CTS) channel access sequence. In addition, MACAW introduces the use of data-sending (DS) messages to form RTS-CTS-DS-DATA-ACK message exchange and a new backoff algorithm (with the "DATA" being the data and "ACK" being and acknowledgement message). An example of a MACAW algorithm is described in a publication by V. Bharghavan, A. Demers, S. Shenker, and L. Zhang entitled "MACAW: A media access protocol for wireless LAN's," Computer Communication Review, vol. 24, (no. 4), (ACM SIGCOMM '94 Conference on Communications Architectures, Protocols and Applications, London, UK, 31 Aug.-2 Sep. 1994.) October 1994. p. 212-25.

As can further be appreciated by one skilled in the art, a Floor Acquisition Multiple Access (FAMA) protocol uses a non-persistent CSMA scheme with RTS/CTS scheme. An example of a FAMA protocol is described in a publication by C. L. Fullmer, J. J. Garcia-Luna-Aceves, entitled "Floor acquisition multiple access (FAMA) for packet-radio networks," Computer Communication Review, vol. 25, (no. 4), (ACM SIGCOMM '95, Cambridge, Mass., USA, 28 Aug.-1 Sep. 1995.) ACM, October 1995. p. 262-73. In addition, the Institute of Electrical and Electronics Engineers (IEEE) Standard 802.11 describes a MAC which is a variation of CSMA/CA protocol that implements both carrier sensing and virtual (RTS-CTS exchange) carrier sensing with acknowledgment messages to improve reliability.

The examples of routing protocols described above can be categorized as proactive and reactive. As can be appreciated by one skilled in the art, another example of a proactive ad-hoc routing protocol is a Destination Sequence Distance Vector (DSDV) routing protocol, and examples of reactive ad-hoc routing protocols are Ad-Hoc On Demand Distance Vector (AODV) and Dynamic Source Routing (DSR). Also, routing protocols that are a hybrid of these types of protocols exists as described in published United States Patent Application Publication No. 2004/0143842 by Avinash Joshi entitled "System and Method for Achieving Continuous Connectivity to an Access Point or Gateway in a Wireless Network Following an On-Demand Routing Protocol, and to Perform Smooth Handoff of Mobile Terminals," the entire contents being incorporated herein by reference.

As can be appreciated by one skilled in the art, when congestion is present in the network 100, the MAC protocols described above can be controlled reduce traffic to thus reduce congestion. Typical MAC protocols have different approaches to slow traffic in the presence of congestion. As will now be discussed, the present invention provides a system and method employing routing metrics that include congestion information which can be used by MAC protocols, such as those discussed above, to avoid the congested nodes 102, 106 or 107 in the network 100. Specifically, the system and method are capable of distributing congestion warning messages in the network 100 without depending on a specific MAC protocol or routing protocol.

For purposes of the following discussion, the operations performed by the system and method according to an embodiment of the present invention will be described with regard to a node 102. However, these operations can be performed by any of the nodes 102, 106 or 107. Furthermore, the operations can be performed by the controller 112 of the node 102, 106 or 107 and its related hardware and software.

In a multihopping network such as network 100, the congestion level at a node 102 (or node 106 or 107) is a function of the traffic that this node 102 forwards to other nodes 102, 106 or 107, and the traffic that its neighbors transmit over the transmission medium that the node 102 shares with its neighbors. Furthermore, other parameters such as the processing power, bandwidth share, mobility pattern and next hop availability affect the congestion level at the node 102. The statistics of the congestion information included in the routing metric depend on the dynamic behavior of the node 102 and its neighboring nodes 102, 106 and/or 107, as well as their channel and traffic characteristics. It is desirable to avoid the congestion before the congestion degrades the performance of the network 100 dramatically. Depending on the dynamic nature of the network 100, the congestion may change over time. Therefore, it is important to estimate the congestion at a particular moment in time.

If the congestion is not persistent, local congestion recovery can be performed at the node 102 by using Layer 2 protocols. Examples of a local recovery method for congestion control is described in U.S. patent application Ser. No. 11/158,737, referenced above, and in U.S. patent application Ser. No. 10/982,762 by Sebnem Z. Ozer et al. entitled "System and Method For Performing Receiver-Assisted Slot Allocation in a Multi-Hop Communication Network", filed on Nov. 8, 2004, the entire contents of which are incorporated herein by reference.

However, if the congestion is persistent, it is desirable to reduce the transmission of the node or nodes 102, 106 and/or 107 acting as the source or sources of the congestion by taking into account Quality of Service (QoS) requirements. In this event, local congestion recovery is generally not sufficient to keep the network 100 stable. According to an embodiment of the present invention, the network 100 should apply traffic control at the intermediate nodes 102, 106 or 107 along a congested path, as well as the node 102, 106 or 107 that is the traffic source for that path, and the nodes 102, 106 or 107 that are the ingress points for that path. To do this, the node 102 experiencing the congestion can check the packet headers of the received packets to determine the node (e.g., another node 102) that is the source of the packet traffic, and can unicast a congestion warning message back to that source node 102.

However, as can be understood in the art, routes between nodes 102, 106 and 107 in multihopping networks are often unidirectional. Therefore, the route that causes the bottleneck in one direction may be different than the route in the other direction. For example, referring to FIG. 1, it can be assumed for purposes of this discussion that node 102-1 is operating as a source node and node 106-1 (an IAP) is a destination node. Although there may be congestion at an intermediate node (e.g., node 102-5) in the downstream route comprising nodes 102-1, 102-3, 102-5, 102-6 and 106-1 in this example, the upstream route from the destination node 106-1 to the source node 102-1 may follow a different path (e.g., nodes 107-2, 102-2 and 107-1 to node 102-1). The system and method according to an embodiment of the present invention utilizes a technique that enables the bottleneck node (in this case node 102-5) to inform the intermediate node or nodes (e.g., node 102-3 in this example) that forwards the packet from the source node 102-1 that contributes to the congestion at the bottleneck node 102-5.

As can be understood in the art, if a routing algorithm maintains the addresses of all nodes along a route for each destination, as in Dynamic Source Routing (DSR), then the bottleneck node 102-5 can send a congestion warning message to the other intermediate nodes, as well as to the ingress nodes and source nodes, that send traffic through this bottleneck node 102-5 to the destination node 106-1. Then the nodes (e.g., nodes 102-1 and 102-3) that receive the message can control their traffic rate as described below. However, as further understood in the art, DSR increases the overhead in the network 100. Hence, according to an embodiment of the present invention, the routing protocols do not require that a node (e.g., node 102-5) maintain all the node addresses along a route, but rather, a minimum amount of address information, such as the address of the source node 102-1, the address of the destination node 106-1, the address of the next hop toward the destination node and the address of the previous hop (the precursor node). Also, if the routing algorithm maintains only one route per destination as in an Ad-Hoc On Demand Distance Vector protocol, then the following technique according to an embodiment of the present invention can be used.

Figure 3:
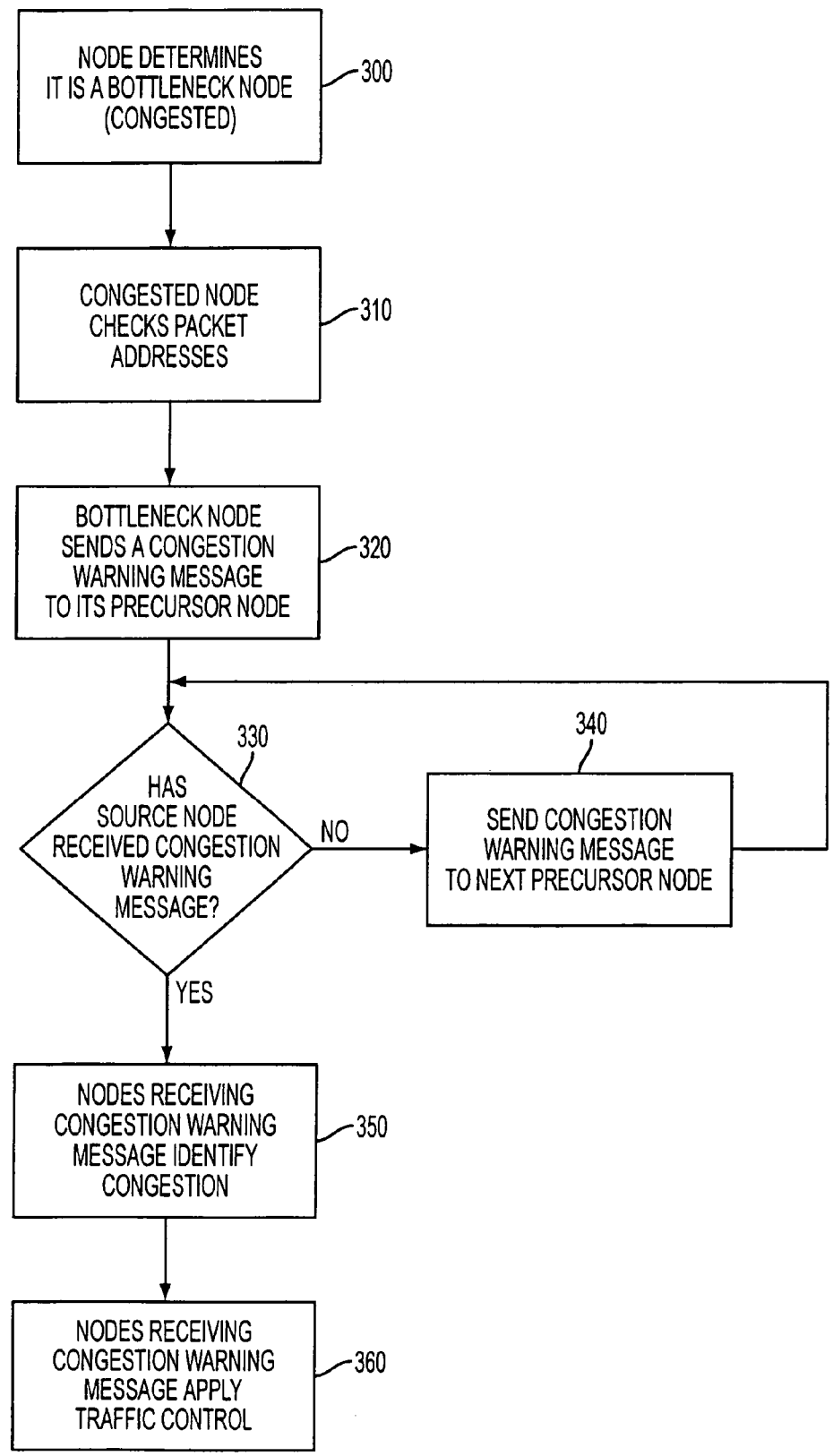
FIG. 3 is a flowchart illustrating an example of operations relating to congestion control as performed by the nodes in the network shown in FIG. 1 according to an embodiment of the present invention.

As shown in the flowchart of FIG. 3, when a node (e.g., node 102-5) determines in step 300 that it is congested and is thus a bottleneck node in a route, the bottleneck node 102-5 in step 310 will check the destination address (the address of node 106-1) and the address of the precursor node (node 102-3) of the packets that the bottleneck node 102-5 receives and forwards. In step 320, the bottleneck node 102-5 will then send a congestion warning message to the precursor node 102-3. The congestion warning message includes the destination address and a congestion metric. In step 330, if the congestion warning message has not reached the source node 102-1, the precursor node 102-3 in step 340 will then send a congestion warning message for this destination to the next precursor node, which in this example is the source node 102-1. In step 350, the corresponding intermediate node(s) 102-3, ingress points (if any) and source node 102-1 will therefore identify this route to the destination node 106-1 as being congested, and will also set a timeout value that indicates the duration of congestion based on the information included in the congestion warning message.

In step 360, any node (e.g., node 102-1 and 102-3 in this example) receiving the congestion warning message that forwards the packets toward the destination node 106-1 may apply traffic control based on the flow, QoS class or route information depending on the information included in the congestion warning message. The congestion warning message can also include the data packet or a part of the data (e.g., the data header). The source node 102-1 can thus check the header to determine the flow identification (ID) if flow-based traffic control is applied. Therefore, if different routes exist to the destination node 106-1, the packet flow that contributes to the congestion in the congested route will be regulated.

Furthermore, other control algorithms can be applied such as changing the route to use an intermediate node (e.g., node 107-n in FIG. 1) that is outside of the congestion area. In this case, if the intermediate node (e.g., node 102-3) can resolve the bottleneck by changing the route, the intermediate ode 102-3 may choose not to forward the congestion warning message to the upstream node or nodes (source node 102-1 in this example). This approach thus allows for congestion control at the intermediate nodes between local and end-point recovery stages.

The traffic control also may be based on the existing traffic shaping and policing algorithms with fairness and service differentiation criteria. Each node may have a minimum flow rate to maintain. If the node's traffic can be maintained for the selected route without having a bottleneck on the path, this rate will be maintained. However, if the intermediate node and ingress point, for example, receives a congestion warning message, the rate of the traffic for this node will be decreased according to the congestion metric and fairness and service differentiation criteria.

If the source node is on the wired network (e.g., fixed network 104) and the destination node (e.g., node 102-1 in this example) is in the wireless area, the access point that is the ingress point (e.g., access point 106-1 in this example) and the intermediate nodes (e.g., nodes 107-2, 102-2, 107-1) will perform traffic control operations as discussed above. For example, the nodes 102-2, 107-1 and 107-2 will maintain a congestion flag per destination or flow to slow down traffic destined for this destination node 102-1. These nodes also maintain a timeout value, and periodically transmit a congestion warning message as discussed above while the congestion exists.

If the source node (e.g., node 102-1) is in the wireless area and the destination is in the wired network (fixed network 104) or the same wireless area but connected to the wired network through the same access point (e.g., access point 106-1) as the source node 102-1, the access point 106-1 that has the source node 102-1 in its service set and the intermediate nodes (e.g., nodes 107-1, 102-2, 107-2) will control the traffic. For ad hoc states (e.g., wireless node to wireless node), the source node can control the traffic if its transceiver supports such functionality.

If the source node (e.g., node 102-1) and the destinations node (e.g., node 102-4) are in different wireless subnets (i.e., each node is in a different wireless segment connected to the wired network with a different access point, such as access points 106-1 and 106-2) and the congestion point is in the wireless area of the source node 102-1, the access point 106-1 that has the source node 102-1 in its service set and the intermediate nodes (e.g., nodes 102-6 and 102-5) that are in the wireless domain of the destination node 102-4 will control the traffic. If the congestion is also present in the wireless site of the destination node 102-4, the congestion message is also exchanged between the access points 106-1 and 106-2.

As can be appreciated from the above, the present invention allows for maintaining fairness and service differentiation during congestion, avoids waste of resources in the wireless domain, and provides network stability.

The embodiments of the present invention also may be used for cross-layer optimization (i.e., optimization of MAC and routing protocols). For example, the distribution of congestion information following the route of the actual data also enables congestion control between different interfaces in multi-transceiver nodes. If multiple transceivers use the same routing layer, then the techniques described above can be used. However, if multiple transceivers use different routing layers, then congestion control should be provided at the interfaces between the different routing layers.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for controlling congestion in an ad-hoc wireless communication network, the method comprising:
   establishing a communication route from a source node to a destination node, at least one of the source node and destination node being in the ad-hoc wireless communication network;

detecting congestion by a congested node, along the communication route, based on dynamic behavior of the congested node and at least one neighboring node associated with the congested node, and channel and traffic characteristics of the ad-hoc wireless communication network;

when congestion is detected at the congested node, operating the congested node to send a congestion warning message for delivery to a source node via at least one intermediate node in the route that forward packets addressed to the destination node through the congested node, wherein the congestion warning message includes a congestion metric, and further wherein the congestion warning message informs the source node and the at least one intermediate node to regulate packet flow that contributes to the congestion in the communication route; and operating the source node, and the at least one intermediate node to each set a timeout value representing a duration of congestion at the congestion node based on information included in the congestion warning message.

2. The method of claim 1, wherein:

the step of operating the congested node when congestion is detected at the congested node comprises operating the congested node to send the congestion warning message to a precursor node for which the congested node acts as a next hop for packets addressed to the destination node that are transmitted by the precursor node.

3. The method as claimed in claim 2, further comprising:

after the congested node sends the congestion warning message to the precursor node, operating the nodes in the route to continue to forward the congestion warning message along a reverse route to the source node.

4. The method as claimed in claim 1, wherein:

the step of operating the congested node when congestion is detected at the congested node comprises operating the congested node to unicast or broadcast the congestion warning message along a reverse route to the source node.

5. The method as claimed in claim 1, further comprising:

operating the nodes in the route that receive the congestion warning message to control packet traffic to the congested node.

6. The method as claimed in claim 1, further comprising:

operating the nodes in the route that receive the congestion warning message to change the route to avoid the congested node.

7. The method as claimed in claim 1, wherein:

one of the source node and the destination node is in the ad-hoc wireless communication network, and one of the source node and the destination node is in a different network, and one of the nodes in the route is an ingress node between the ad-hoc wireless network and the different network; and the method further comprises operating the ingress node to perform traffic control in response to the congestion warning message.

8. The method as claimed in claim 1, further comprising:

operating the nodes in the route that receive the congestion warning message to set the timeout value representing the duration of the congestion at the congested node.

9. The method as claimed in claim 1, wherein:

at least one node in the route comprises multiple transceivers; and the method further comprises operating the multiple transceiver node to control traffic through the interface between the multiple transceivers in response to the congestion warning message.

10. The method as claimed in claim 1, wherein:

the congestion warning message comprises at least one of an address of the destination node and the congestion metric representing congestion at the congested node.

11. An ad-hoc wireless communication network, comprising:

a plurality of nodes, comprising a source node and a destination node, the source node operating to communicate with the destination node via a route comprising at least one of the plurality of nodes;

each node in the route operating to identify whether it is a congested node based on dynamic behavior of the congested node and at least one neighboring node associated with the congested node, and channel and traffic characteristics of the ad-hoc wireless communication network and, in response, sending a congestion warning message for delivery to the source node via at least one other node in the route that forwards packets addressed to the destination node through the congested node, wherein the congestion warning message, includes a congestion metric, and further wherein the congestion warning message informs the source node and the at least one other node, to regulate packet flow that contributes to the congestion in the communication route; and the source node and the at least one other node in the route, operating to each set a timeout value representing a duration of congestion at the congestion node based on information included in the congestion warning message.

12. The ad-hoc wireless communication network as claimed in claim 11, wherein:

the congested node is further sends the congestion warning message to a precursor node for which the congested node acts as a next hop for packets addressed to the destination node that are transmitted by the precursor node.

13. The ad-hoc wireless communication network as claimed in claim 12, wherein:

the at least one other node in the route continues to forward the congestion warning message along a reverse route to the source node.

14. The ad-hoc wireless communication network as claimed in claim 11, wherein:

the congested node unicasts or broadcasts the congestion warning message along a reverse route to the source node.

15. The ad-hoc wireless communication network as claimed in claim 11, wherein:

each node in the route and the source node that receives the congestion warning message control packet traffic to the congested node.

16. The ad-hoc wireless communication network as claimed in claim 11, wherein:

each node in the route and the source node that receives the congestion warning message change the route to avoid the congested node.

17. The ad-hoc wireless communication network as claimed in claim 11, wherein:

one of the source node and the destination node is in the wireless communication network and one of the source node and the destination node is in a different network, and one of the nodes in the route is an ingress node between the wireless network and the different network; and the ingress node performs traffic control in response to the congestion warning message.

18. The ad-hoc wireless communication network as claimed in claim 11, further comprising:

said at least one other node in the route that receives the congestion warning message sets the timeout value representing the duration of the congestion at the congested node.

19. The ad-hoc wireless communication network as claimed in claim 11, wherein:

at least one node in the route comprises multiple transceivers; and the node comprising the multiple transceivers controls traffic through the interface between the multiple transceivers in response to the congestion warning message.

20. The ad-hoc wireless communication network as claimed in claim 11, wherein:

the congestion warning message comprises at least one of an address of the destination node and a congestion metric representing congestion at the congested node.

* * * * *